(12) United States Patent
Williams

(10) Patent No.: US 8,118,969 B2
(45) Date of Patent: Feb. 21, 2012

(54) WATER-BASED POLYCHLOROPRENE ADHESIVE

(75) Inventor: Donald R. Williams, Plymouth, MA (US)

(73) Assignee: Illinois Tool Works Inc., Glenview, IL (US)

( * ) Notice: Subject to any disclaimer, the term of this patent is extended or adjusted under 35 U.S.C. 154(b) by 902 days.

(21) Appl. No.: 11/942,047

(22) Filed: Nov. 19, 2007

(65) Prior Publication Data

US 2008/0128083 A1 Jun. 5, 2008

Related U.S. Application Data

(60) Provisional application No. 60/867,832, filed on Nov. 30, 2006.

(51) Int. Cl.
  *C04B 37/00* (2006.01)
  *C09J 163/00* (2006.01)
  *A62C 13/62* (2006.01)
  *A62C 13/66* (2006.01)
  *A62C 35/58* (2006.01)
  *B05B 9/03* (2006.01)
  *C08F 214/08* (2006.01)
  *C08L 27/00* (2006.01)

(52) U.S. Cl. ......... 156/325; 156/333; 239/302; 524/519

(58) Field of Classification Search ............ 156/325, 156/333; 239/302; 524/519
See application file for complete search history.

(56) References Cited

U.S. PATENT DOCUMENTS

| | | | |
|---|---|---|---|
| 5,264,467 A | 11/1993 | DiStefano | |
| 5,476,896 A | 12/1995 | Pereira et al. | |
| 5,543,455 A | 8/1996 | Shah | |
| 5,721,302 A | 2/1998 | Wood et al. | |
| 5,728,759 A | 3/1998 | Pike | |
| 6,310,125 B1 | 10/2001 | Raynes | |
| 6,440,259 B1 | 8/2002 | Patel | |
| 6,767,947 B2 | 7/2004 | Musch et al. | |
| 6,848,599 B2 | 2/2005 | Hammarth et al. | |
| 6,905,084 B2 | 6/2005 | Hammarth et al. | |
| 2004/0035881 A1* | 2/2004 | Hammarth et al. | 222/105 |
| 2006/0069196 A1 | 3/2006 | Grabowski et al. | |
| 2007/0224395 A1 | 9/2007 | Rowitsch et al. | |

FOREIGN PATENT DOCUMENTS

| | | |
|---|---|---|
| EP | 0517983 A1 | 12/1992 |
| EP | 1607420 A1 | 12/2005 |
| JP | 58089602 | 5/1983 |
| JP | 59210917 | 11/1984 |
| JP | 62096576 A | 5/1987 |
| JP | 3076734 | 4/1991 |
| JP | 4023877 | 1/1992 |
| JP | 5320600 | 12/1993 |
| JP | 6256738 | 9/1994 |
| JP | 6287360 | 10/1994 |
| JP | 2002-053829 A | 2/2002 |
| JP | 2002-121516 | 4/2002 |
| JP | 2002-257199 | 9/2002 |
| JP | 2004-197028 A | 7/2004 |
| WO | 2004044037 A1 | 5/2004 |

* cited by examiner

*Primary Examiner* — Philip Tucker
*Assistant Examiner* — Michael Orlando
(74) *Attorney, Agent, or Firm* — Whyte Hirschboeck Dudek S.C.

(57) ABSTRACT

The use of a carboxylated acrylic resin for blending with a medium gel, medium crystallinity polychloroprene gives a waterborne adhesive formulation with an excellent combination of green strength, heat resistance, bond strength and sprayability unobtainable by other techniques reported by those skilled in the art. The adhesives described in the invention are environmentally friendly and have particular usefulness in postforming operations where a combination of green strength and heat resistance are critical.

18 Claims, No Drawings

WATER-BASED POLYCHLOROPRENE ADHESIVE

CROSS REFERENCE TO RELATED APPLICATION

This application claims the benefit of pending U.S. provisional application Ser. No. 60/867,832 filed on Nov. 30, 2006.

FIELD OF THE INVENTION

The present invention relates to waterborne adhesive compositions based on blends of polychloroprene dispersions and functionalized acrylic-based dispersions that have improved green strength, heat resistance, bond strength and sprayability over adhesive compositions based on polychloroprene dispersions alone.

BACKGROUND OF THE INVENTION

For the purposes of the ensuing discussion, the following definitions will be in effect. A contact adhesive refers to an adhesive that is applied to at least one of two substrates to be bonded and allowed to dry before mating the two substrates under pressure. An adhesive is considered to be sprayable when it can be applied to a substrate under pressure (whether externally as in a pressure pot arrangement or internally as in a canister) without the adhesive emulsion exhibiting shear instability, edge banding, excessive dripping, overspraying, pulsing or the like. Good green strength is characterized by quick grab or adhesion of the two bonding substrates to each other followed by almost immediate development of high bond strength.

Both solvent- and water-based contact adhesives using polychloroprene are well-known in the art. While solvent-based polychloroprene contact adhesives have the advantage of quicker drying time, insurance and air quality regulations are making water-based contact adhesives increasingly attractive in the marketplace.

Polychloroprene-based contact adhesive properties depend on polychloroprene functionality, crystallinity and gel content. The presence of polar functional groups in the rubber chain provides reactivity with substrate surfaces (especially metals), reactivity with crosslinking agents such as magnesium and zinc oxides to improve heat resistance and green strength and rheology that allows sprayability. As crystallinity increases, there is a corresponding increase in tensile strength, wet contactability, water resistance and room temperature strength. High gel content improves cohesive strength, heat resistance and tensile strength of the adhesive.

Formulators of polychloroprene-based adhesives have devoted extensive effort to optimizing adhesive properties by systematically varying functionality, crystallinity and gel content. Numerous patents have been issued disclosing additional novel approaches to improving and optimizing bond strength, green strength, sprayability and temperature resistance.

Patel (U.S. Pat. No. 6,440,259) discloses the use of a one-part storage-stable water-based contact adhesive with an internal coagulant that develops "enough strength for demanding applications within a short period of time."

Addition of a tricyclic diterpenecarboxylic acid to a polychloroprene dispersion is reported (Musch, et al, U.S. Pat. No. 6,767,947) to substantially improve heat resistance.

The use of carboxylated polychloroprenes is the easiest and most obvious way to combine functionality, crystallinity and gel content into one polymer system. Pereira et al (U.S. Pat. No. 5,476,896) describe the use of carboxylated polychloroprene (elastomeric properties) and carboxylated ethylene-vinyl acetate (toughness) dispersions in combination with organic crosslinkers to more closely match application characteristics of solvent-based contact adhesives. Carboxylated polychloroprenes for adhesive systems are reported by Sato et al (JP 06256738A2 and JP 06287360A2) to give high shear strength. Masuko (JP 03076734A2) uses a poly(chloroprene-methacrylic acid) polymer for its vibration insulation properties. Polychloroprenes, however, prefer an alkaline environment; the presence of acidity in any form leads to stability and shelf life issues.

Another approach involves incorporation of other carboxylated polymers as grafts onto the polychloroprene rubber base. Carboxylated styrene-butadiene grafts onto polychloroprene are reported by Lima et al (EP Application 1607420A1) to impart good tacking capacity and high heat resistance to the resulting adhesive. Toyo Soda Mfg. Co., Ltd., Japan (JP 59210917A2 and JP 58089602A2) discloses good initial bonding strength from latexes formed by grafting chloroprene onto copolymers with acid-containing monomers. A vulcanization process is reported by Suefuji et al (JP 2002/257199A2) to be useful in preparing polychloroprene rubber power transmission belts. Grafting and vulcanization processes are not necessarily robust in practice and do not always yield reproducible polymer properties.

Other inventors have used polymer blends to adjust adhesive properties. Jaffari et al (EP Application 0517983A1) disclose using a mixture of styrene-butadiene rubber latex (SBR), polychloroprene latex and an ammonium salt of an acrylic polymer as a water-resistant maskant. A high shear strength flooring adhesive prepared by blending polyurethanes with a variety of latexes including polychloroprenes and carboxylated SBR is reported by Wood, et al (U.S. Pat. No. 5,721,302). Rayner (U.S. Pat. No. 6,310,125) uses a blend of high modulus polyurethane, polychloroprene and an acrylic ester copolymer to prepare adhesives with excellent heat resistance. Horiuchi et al (JP 2002/121516A2) blend poly(ethylene oxide), poly(N-vinylacetamide) or poly (acrylic acid) with polychloroprene to obtain good adhesion to polyurethane foam. Addition of poly(acrylic acid) sodium salt is reported by Ono et al (JP 05320600A2) to improve spray coatability of polychloroprene adhesives. Not all carboxylated polymers are compatible with the polychloroprene. Phase separation of the blended polymers can lead to inferior adhesive properties.

Carboxylated polymers are of particular interest in these systems since they can be crosslinked using organic (see Pereira et al, U.S. Pat. No. 5,476,896 cited above) or metal oxide crosslinkers. The use of metal oxide crosslinkers in a carboxylated polychloroprene is reported by Lew et al (WO 2004/044037A1) to give improved tensile strength and non-staining latex gloves.

Acrylic waterborne contact adhesives are known (Shah, U.S. Pat. No. 5,543,455) but they are expensive, lack the strength inherent to the crystallinity in polychloroprene and resistance to high temperature. Taga et al (JP 04023877A2) has even used a mixture of polychloroprene and carboxylated acrylic emulsions but these must be applied separately because of stability issues.

None of the above expedients, other than carboxylated polychloroprene, give a water-based contact adhesive with the combination of good sprayability, green strength, heat resistance and long-term bond strength.

BRIEF SUMMARY OF THE INVENTION

In one aspect, the invention provides a stabilized, one-part water-based contact adhesive composition that comprises a polychloroprene/carboxylated acrylic adhesive component, a resinous component, a stabilizer component and a crosslinker component. The composition consists essentially of:

(A) between about 30 and about 80 total weight percent of a carboxylated or non-carboxylated polychloroprene dispersion;

(B) between about 0.01 and about 45 total weight percent of a carboxylated acrylic polymer dispersion;

(C) between about 0.01 and about 45 total weight percent of a resin dispersion package;

(D) between about 0.01 and about 10 total weight percent of a crosslinker dispersion; and (E) between about 0.01 and about 5 total weight percent of a stabilizer package in an amount to stabilize (A)-(D).

In another aspect, the invention is a process for making a laminated article, the process comprising applying an adhesive to one or both substrate surfaces and placing a second substrate layer over the first substrate layer such that a surface of the second substrate layer is in contact with the surface of the first substrate layer, wherein the adhesive is a one-step water-based adhesive composition consisting essentially of:

(A) about 30 to about 80 total weight percent of a polychloroprene resin aqueous dispersion;

(B) about 0.01 to about 45 total weight percent of a carboxylated acrylic polymer dispersion;

(C) about 0.01 to about 45 total weight percent of a resin aqueous dispersion, wherein the resin is at least one of hydrocarbon resins, disproportionated rosins, rosin esters, terpene resins, acrylic resins, hydrogenated rosin esters, polymerized rosin esters, dimerized rosins, or acid-modified rosin esters;

(D) about 0.01 to about 10 total weight percent of a crosslinker aqueous dispersion; and (E) about 0.01 to about 5 total weight percent of a stabilizer in an amount to stabilize (A)-(D).

The resulting contact adhesive composition has a balance of an excellent rheology for spraying, grab tack and green strength equal to that of solvent-based contact adhesives, superior bond strength and exceptional heat stability.

DETAILED DESCRIPTION OF THE INVENTION

Contact adhesives are typically used to bond high pressure laminate (HPL) to a more porous particle board or medium density fiberboard substrate to form kitchen countertops or office furniture tops. In practice, both substrates are coated with adhesive using spray, brush or roller and the adhesive is allowed to dry to a clear film before the two substrate surfaces are mated. After bonding, pressure is applied using, for example, a J-roller in order to improve the quality of the adhesive bond and reduce costly delamination.

Polychloroprene is generally the rubber of choice for this application. The degree of polychloroprene crystallinity (controlled by polymerization process conditions and monomer composition) relates directly to the quick grab of the adhesive for which polychloroprene adhesives are particularly well known. Preferably, the polychloroprene has medium or high, more preferably medium, crystallinity. Crystallinity also has a positive effect on room temperature bond strength, tensile strength and water resistance. Gel content can also be controlled by polymerization parameters and contributes to cohesive strength, heat resistance and tensile strength. Preferably, the polychloroprene has a medium or high, more preferably medium, gel content. Manufacturers learned to incorporate a small amount of acid into the polychloroprene polymer and the functionality provides further contribution to tensile strength, metal adhesion and quick grab. In addition, in combination with crosslinking systems, the functionalized polychloroprenes can exhibit extremely high heat resistance making them suitable for such high temperature operations as post-forming.

Water-based polychloroprene formulations suffer from slower drying times and weaker green strength relative to the solvent-based adhesives. On the other hand, there is considerable pressure from regulatory and insurance agencies to convert solvent-based adhesives (particularly when the solvents are flammable) to water-based formulations. Hence there is significant impetus to improve green strength and reduce drying time of water-based contact adhesives.

Bonding of flat sections of particle board and HPL (flat-forming) does not require any additional heat to induce the HPL to conform to the shape of the particle board. In the post-forming operation, where the HPL must follow the contours of a backsplash, the HPL (and the adhesive) must be heated strongly before and during bonding. For an adhesive to be post-formable, it must be able to withstand elevated temperature while being capable of forming a strong bond at that temperature.

Application of the adhesive to the substrate surfaces and cleanup are time-consuming operations. It is therefore advantageous if the end-user can use a pressure pot or a self-contained canister to apply the adhesive more quickly. In the case of the canister, there is little or no cleanup time. Hammarth, et al (U.S. Pat. Nos. 6,848,599 and 6,905,084) have suggested methodology for adapting metal canisters for use with water-based adhesives. The adhesive must have the proper rheology to allow good sprayability—no dripping and minimal overspraying are requirements. Spray gun tip clogging due to adhesive dispersion shear instability must be prevented at all costs. Incompatibility of the adhesive with the propellant system can cause pulsing or edge banding.

Finally, the other components of the formulation must be chosen so as to be compatible with the polychloroprene dispersion. Failure to do so will result in phase separation which will adversely affect sprayability, bond strength, heat resistance and green strength properties. The adhesive film must be strong, homogeneous and continuous to encourage rapid, strong bond formation. Phase separation can also severely interfere with the crosslinking reactions needed to build heat resistance.

Polychloroprenes are generally prepared at high pH in order to prevent decomposition by autocatalytic dehydrochlorination. Shelf life of carboxylated polychloroprenes is substantially reduced (typically 6 months) by the presence of the carboxyl groups and these materials must be stored at lower temperatures and substantial control exerted over process conditions to achieve six months shelf life. Prices for the carboxylated grades have been rising sharply and it seems advantageous to seek alternate formulations that provide sprayability, bond strength, heat resistance and green strength.

Testing of formulations in which the carboxylated polychloroprene is replaced by non-carboxylated polychloroprene gives unsatisfactory heat resistance, green strength or both. While none of the non-carboxylated polychloroprenes provide all the needed properties for a good contact adhesive, the results indicate that the combination of medium gel and medium crystallization may be desirable for the polychloroprene component of the adhesive formulation. It is further apparent from these results that some carboxylate functionality is needed to achieve the proper balance of green strength, heat resistance, bond strength and sprayability.

Surprisingly, it was found that the addition of preferably a functionalized acrylic-, vinyl acrylic- or vinyl-based emulsion, more preferably a carboxylated acrylic-, styrene maleic anhydride-, vinyl acrylic- or vinyl-based emulsion or most preferably a carboxylated acrylic- or vinyl acrylic-based emulsion to the formulation significantly improves green strength, heat resistance, bond strength and sprayability. Extensive testing has confirmed that these novel formulations have adhesive and application properties better than or equal to formulations containing the more expensive carboxylated polychloroprene.

Theories are suggested throughout this disclosure to better understand the present invention but are not intended to limit the effective scope of the claims. It is apparent from the results that the functionalized polymer added to the polychloroprene formulation strongly affects bond strength, heat resistance, green strength and sprayability.

Bond strength can be improved in a number of ways. Polymer alloys are often known to yield properties that are better than either of the polymeric components. If the added functionalized polymer is compatible with the polychloroprene, it may be able to improve the cohesive strength of the polychloroprene rubber through polymer-polymer interactions or via the functional groups. For example, the added functionalized polymer may be extending the effective molecular weight of the polychloroprene chains by linking them together much the same as high molecular weight acrylic processing aids improve the performance of rigid PVC.

Metal oxides are commonly added to adhesive formulations to serve as crosslinking sites. Too much crosslinking can cause brittleness and deterioration of bond strength. Too little crosslinking may reduce heat resistance to the point where the adhesive fails at a temperature that is too low to be useful. The optimum ratio of crosslinker components, the correct location of the functional groups on the polymer chain and compatibility between the main rubber component (polychloroprene) and the functionalized polymer rubber component can thus lead to excellent heat resistance.

While green strength is affected by the choice of tackifier resins and water evaporation rate, the increase in green strength after addition of the functionalized polymer to the formulation must be due to other effects since both tackifier resin and solids levels were held constant during the discovery experiments. It is postulated that the ideal functionalized polymer should have some pressure sensitive properties so that it too can provide significant tack to the formulation especially if compatibility considerations allow preferential migration of the functionalized polymer to the surface of the film during adhesion.

Sprayability is strongly influenced by the rheology of the adhesive formulation. Higher levels of functionality (such as might be present if all functionality is present in the major polychloroprene rubber component) may require higher spray pressures to effectively atomize the adhesive, resulting in more frequent spray gun tip clogging due to increased shear or in greater amounts of undesirable overspray. If the minor rubber component (the functionalized polymer) has the same or lower amounts of the functional monomer, the polymer-polymer interactions may be reduced to the point where sprayability improves without sacrificing bond strength, heat resistance or green strength.

In the most preferred embodiment, a typical formulation for the water-based adhesives of the present invention consists essentially of:

(A) between about 30 and about 80 total weight percent of a carboxylated or non-carboxylated polychloroprene dispersion;

(B) between about 0.01 and about 45 total weight percent of a compatible carboxylated or non-carboxylated functionalized polymer dispersion, wherein the % carboxylate-containing monomer in (B) is about 0.01 to about 25 weight percent;

(C) between about 0.01 and about 45 total weight percent of a resin dispersion package;

(D) between about 0.01 and about 10 total weight percent of a crosslinker dispersion; and (E) between about 0.01 and about 5% of a stabilizer package in an amount to stabilize (A)-(D).

The water-based adhesive formulations of the present invention contain at least one polychloroprene, most preferably of the medium gel, medium crystallinity variety. Comonomers such as styrene, vinyl toluene, 2,3-dichlorobutadiene, acrylic acid, methacrylic acid and derivatives such as acrylates, methacrylates and acrylonitriles that are commonly copolymerized with chloroprene may also be included.

The most preferred functionalized polymer dispersion is a carboxylated acrylic emulsion. In addition, ethylene-vinyl acetate, vinyl-acrylic and vinyl polymers or blends can be used. The functional groups vary in percent of the functionalized polymer dispersion from about 0.01% to about 35% by weight and consist of acid, alcohol, amine, amide, thiol and the like or a mixture. The key characteristics of the functionalized polymer are: 1) compatibility with the polychloroprene rubber component; 2) the presence of one or more polar functional groups; and 3) a pH that is close to that of the final formulation. The last consideration is an important one—functionalized polymer dispersions whose pH is too low will coagulate the adhesive formulation.

The water-based adhesive formulations described in this invention may also contain one or more thermoplastic resin dispersions from the categories of hydrocarbon resins, disproportionated rosins, rosin esters, terpene resins, acrylic resins, hydrogenated rosin esters, polymerized rosin esters, dimerized rosins, acid-modified rosin esters and the like. Preferably, these thermoplastic resin dispersions are compatible with both the polychloroprene and the functionalized polymer. In order to maintain high heat resistance, the thermoplastic resin dispersions should preferably have a softening point of 80° C. or above.

Metal oxide-based dispersions serve two functions in the formulations of the present invention: 1) they neutralize hydrochloric acid from the slow dehydrochlorination of polychloroprene and 2) they crosslink the functional groups to provide excellent bond strength and heat resistance. Such basic compositions are derived from alkali metals and alkaline earth metals such as sodium, potassium, calcium, magnesium and the like. Derivatives of other metals such as zinc are also effective. While oxides and hydroxides are preferred, carbonates, bicarbonates, phosphates, pyrophosphates, biphosphates, borates and the like can also be used. Organic crosslinking agents that react with the functionalized polymer are also suitable for this invention. Included in this group are melamine-formaldehyde resins, phenol-formaldehyde resins and aldehydes such as glyoxal.

A stabilizer dispersion, appropriate to the formulation, provides an antioxidant that protects the adhesive from thermal degradation. Typically, these are aromatic amines, substituted phenols, quinones or the like.

The inventive adhesive formulation is generally useful for most spray adhesive applications. In particular, the adhesive is useful in applications where the presence of organic solvents or polyurethanes is undesirable. In one embodiment, the adhesive can be used in laminating processes, such as those processes used to make laminated countertops, cabinets or furniture.

The adhesive can be applied by standard equipment such as brushes, rollers or spray systems. The water-based spray adhesives may be applied using air-assisted equipment or with airless canister and aerosol systems that offer the advantages of portability, ease of cleaning and convenience over more conventional air-assisted spray systems. Suitable canisters include those described by Hammarth et al. (U.S. Pat. Nos. 6,848,599 and 6,905,084, both patents incorporated herein by reference). The use of a collapsible bag (to contain the adhesive) in a canister prevents contact of the water-based adhesive with both the metal canister and with the potentially non-compatible propellant system, which is present in the space between the bag and the canister. These patents also describe a gun that enables the end user to clear the tip when the valve is closed.

Another suitable canister system comprises: a container having an inner wall and at least one entry port; a valve connected to the entry port, wherein the container and valve are adapted to contain pressurized materials within the container; an inner layer that is resistant to corrosion from contact with water, wherein the inner layer is in contact with, and at least substantially covers, the inner wall; an aqueous adhesive composition; and, at least one propellant, wherein the aqueous composition and the propellant are each disposed within the container and are in contact with each other. The container can be made of metal or a composite material.

EXAMPLES

In the examples described below and in the evaluation of the products formulated in accordance with the present invention, the following tests were used to evaluate bond strength (block shear and cleavage tests), green strength (quick grab/octagon and qualitative hot bond grab tests) heat resistance (dead load heat shear and postformability tests) and sprayability.

Block Shear:

Standard block shear testing is used as follows: 2½"×2"×11/16" 13-ply birch plywood pieces are marked to allow 4 square inches of bonding. Each piece of plywood is brush-coated with the recommended amount of adhesive (2 coats) and bonded and J-rolled after 15 minutes drying time. Samples are tested on a Lloyd's Tester (Chatillon Materials Testing LR 10K) at 0.2"/minute jaws speed under the compression mode using a jig. At least three replicates are prepared for each adhesive.

Cleavage:

Standard cleavage testing is used as follows: pieces of 4"×6"×⅝" plywood and 3"×4" high pressure laminate are marked to create 2"×4" bond areas (8 square inches). The plywood bond area is double-coated and the HPL is single-coated with the adhesive in question at the recommended coat weight and the pieces are mated and J-rolled after 15 minutes drying time. Cleavage testing is run on the Lloyd's Tester (Chatillon Materials Testing LR 10K) at 5"/min jaws speed. Three replicates are run for each adhesive.

Quick Grab/Octagon Test:

All formulations are brushed onto 1'×1' pieces of high pressure laminate (1 coat) and ⅝" particle board (2 coats) at the recommended coat weight, air dried and mated by turning the high pressure laminate 90 degrees out of phase with the particle board such that an 8-pointed shape results. After J-rolling, one corner is pulled manually after 1 minute to assess "legs," "hallways" and immediate bond strength development. A second corner is pulled after 24 hours conditioning time and a third corner is pulled after 72 hours.

Qualitative Hot Bond Grab Test:

The particle board and high pressure laminate substrates are coated with adhesive and the pieces are mated and J-rolled. Two sets are placed in an oven at a temperature appropriate for the end use application. One set is manually pulled after 30 minutes and the other after 60 minutes. The bond strength of each sample is qualitatively rated on a 5 point scale.

Dead Load Heat Shear (DLHS):

Standard dead load heat shear testing is used as follows: plywood (2 coats) and high pressure laminate (1 coat) are coated with adhesive, bonded after 15 minutes open time, J-rolled and conditioned at room temperature for 7 days. Samples are cut into pieces having a 1"×1" bond area and a 1" overhang; a 1-pound weight is hung from the overhang and samples are suspended from hooks in the oven. The oven is heated to 122° F. and held for 30 minutes, and then increased 12.6° F. every 15 minutes up to 324° or 399° F. and failure temperatures are noted. Three replicates are run for each adhesive.

Postformability Test:

The substrates (spruce and postformable high pressure laminate) are coated with adhesive, mated and J-rolled. The whole assembly is placed in an oven at a temperature appropriate for the end use application for 15 minutes. At the end of 15 minutes heating, the HPL is bent around the spruce, mated, and J-rolled. A "pass" is recorded if the high pressure laminate sample adheres hot to the opposite side of the spruce.

Sprayability:

All formulations are sprayed using a DeVilbiss KBII stainless steel two quart pressure cup and Binks HVLP gun. Pot pressure, tip pressure and tip band width are varied and sprayability robustness is noted.

Control—Carboxylated Polychloroprene

Into a 1-gallon container are added with stirring successively 2323.4 grams of carboxylated polychloroprene latex (typically 55-60% solids), 54.7 grams of stabilizer latex (typically 50-55% solids), 91.5 grams of crosslinker dispersion (typically 55-65% solids), 319.8 grams of hydrocarbon resin dispersion (typically 45-55% solids) and 498.1 grams of disproportionated rosin latex (typically 55-65% solids). Stirring is maintained at a rate sufficient to thoroughly mix the components of the formulation but not so high as to destabilize the emulsion.

This formulation is representative of the standard line of contact adhesives based on carboxylated polychloroprene latexes and will be considered the control. Table 1 describes the properties of the carboxylated polychloroprene.

TABLE 1

| Description of Carboxylated Polychloroprenes | | |
|---|---|---|
| Example | Crystallinity | Gel Content |
| CONTROL | Medium | Medium |

Comparative Samples—1-4—Non-Carboxylated Polychloroprene

Into a 1-gallon container are added with stirring successively 2323.4 grams of non-carboxylated polychloroprene latex (typically 55-60% solids), 54.7 grams of stabilizer latex, 91.5 grams of crosslinker dispersion, 319.8 grams of hydrocarbon resin dispersion and 498.1 grams of disproportionated rosin latex. Stirring is maintained at a rate sufficient to thoroughly mix the components of the formulation but not so high as to destabilize the emulsion.

Four different non-carboxylated polychloroprenes (A-D) were used to prepare these Comparative Samples. Table 2 describes the general properties of the four non-carboxylated polychloroprenes.

TABLE 2

Description of Non-Carboxylated Polychloroprenes

| Example | Polychloroprene | Crystallinity | Gel Content |
| --- | --- | --- | --- |
| 1 | A | Medium | Medium |
| 2 | B | Medium | Low |
| 3 | C | Low | Medium |
| 4 | D | High | Low |

Experience teaches that heat resistance and green strength are the most difficult properties to reproduce upon removal of carboxylated polychloroprene from the formulation. Accordingly, initial screen testing involves dead load heat shear and quick grab/octagon testing.

Dead load heat shear results for the CONTROL and Comparative Samples 1-4 are given in Table 3. The test was stopped at 324° F.

TABLE 3

Dead Load Heat Shear Comparison

| Example | Polychloroprene | Failure T1 | Failure T2 | Failure T3 |
| --- | --- | --- | --- | --- |
| CONTROL | CONTROL | >324° F. | >324° F. | >324° F. |
| Comp. Sample 1 | A | >324° F. | 198° F. | >324° F. |
| Comp. Sample 2 | B | >324° F. | >324° F. | >324° F. |
| Comp. Sample 3 | C | 135° F. | 122° F. | 122° F. |
| Comp. Sample 4 | D | 122° F. | 147° F. | 135° F. |

Formulations using polychloroprenes A and B (Comparative Sample 1 and Comparative Sample 2) are comparable in dead load heat shear to the CONTROL carboxylated polychloroprene formulation. The formulation with polychloroprene A (Comparative Sample 1) has one low value out of the 3 replications in this screen. The formulations with polychloroprenes C and D (Comparative Sample 3 and Comparative Sample 4) consistently failed at temperatures that were unacceptably low for many applications.

Table 4 reports the results of a screen of the CONTROL and Comparative Samples 1-4 using the quick grab/octagon test.

TABLE 4

Quick Grab/Octagon Test Comparison of Control and Comparative Samples 1-4

| Example | Polychloroprene | Initial Bond Strength | Initial Pull, Legs | Initial Pull, Adhesion, Hallways | 48, 72 Hr |
| --- | --- | --- | --- | --- | --- |
| CONTROL | CONTROL | Great | Many, short to medium | Adhesion to both substrates, no hallways | Very strong |
| Comp. Sample 1 | A | Good | Not as dense, medium | Some adhesive failure on particle board | Strong |
| Comp. Sample 2 | B | Poor | Long | Adhesive failure on particle board, hallways | Medium |
| Comp. Sample 3 | C | Good | Not as dense, medium | Small hallways | Strong |
| Comp. Sample 4 | D | Poor | Long | Much adhesive failure on HPL, large hallways | Medium |

Legs are defined as the tendrils of adhesive that stretch between the two substrates when the bond is pulled apart. Short legs indicate a strong bond. The presence of hallways, or spaces, between the leg tendrils is usually indicative of a weaker bond.

These results suggest that none of the candidate polychloroprenes (A-D) alone can match the quick grab strength of the CONTROL carboxylated polychloroprene. According to this test, the best candidates for quick grab or green strength are polychloroprenes A and C (Comparative Sample 1 and Comparative Sample 3). The CONTROL and Comparative Samples 1-4 have roughly equivalent block shear, cleavage and sprayability.

Comparative Samples 5 and 6—Polychloroprene A with Carboxylated Acrylic A

Into a 1-gallon container are added with stirring successively X grams of non-carboxylated polychloroprene latex A, 54.7 grams of stabilizer latex, 91.5 grams of crosslinker dispersion, 319.8 grams of hydrocarbon resin dispersion, 498.1 grams of disproportionated rosin latex and Y grams of carboxylated acrylic latex A (typically 50-60% solids). Stirring is maintained at a rate sufficient to thoroughly mix the components of the formulation but not so high as to destabilize the emulsion.

Table 5 provides a key to the composition of Comparative Samples 5 and 6.

TABLE 5

Composition of Comparative Samples 5 and 6

| Example | Polychloroprene | Carboxylated Acrylic | X grams | Y grams |
| --- | --- | --- | --- | --- |
| Comp. Sample 5 | A | A | 2091.2 | 232.2 |
| Comp. Sample 6 | A | A | 1859.0 | 464.4 |

Comparative Samples 5 and 6 are screened for heat resistance using the qualitative hot bond grab test and the quick grab/octagon test. The results for the qualitative hot bond grab test are reported in Table 6. Data for the CONTROL are given for comparison.

TABLE 6

Qualitative Hot Bond Grab Test Comparison

| Example | Polychloroprene | Carboxylated Acrylic | Rating 30 Min | Rating 60 Min |
|---|---|---|---|---|
| CONTROL | CONTROL | None | 2 | 4 |
| Comp. Sample 5 | A | A | 1 | 1 |
| Comp. Sample 6 | A | A | 1 | 0-1 |

Clearly, carboxylated acrylic A does not improve the formulations in Comparative Samples 5 and 6 to the point where they equal the qualitative hot bond grab test results for the CONTROL.

Results for the quick grab/octagon test are reported in Table 7. Data for the CONTROL are given for comparison.

TABLE 7

Quick Grab/Octagon Test Comparison of the CONTROL and Comparative Samples 5 and 6

| Example | Polychloroprene | Carboxylated Acrylic | Initial Bond Strength | Initial Pull, Legs | Initial Pull, Adhesion, Hallways | 48, 72 Hr |
|---|---|---|---|---|---|---|
| CONTROL | CONTROL | None | Great | Many, short to medium | Adhesion to both substrates, no hallways | Very strong |
| Comp. Sample 5 | A | A | Fair | Many, short | Some hallways, weaker than CONTROL | Strong - can lift edge |
| Comp. Sample 6 | A | A | Poor | Many, long | Hallways, weaker than Comp. Sample 5 | Strong - can lift edge |

There is not sufficient improvement in green strength to continue testing carboxylated acrylic A.

Comparative Samples 7 and 8—Polychloroprene B with Carboxylated Acrylic B

Into a 1-gallon container are added with stirring successively X grams of non-carboxylated polychloroprene latex B (typically 55-60% solids), 54.7 grams of stabilizer latex, 91.5 grams of crosslinker dispersion, 319.8 grams of hydrocarbon resin dispersion, 498.1 grams of a disproportionated rosin latex and Y grams of carboxylated acrylic latex B (typically 50-60% solids). Stirring is maintained at a rate sufficient to thoroughly mix the components of the formulation but not so high as to destabilize the emulsion.

Table 8 provides a key to the composition of Comparative Samples 7 and 8.

TABLE 8

Composition of Comparative Samples 7 and 8

| Example | Polychloroprene | Carboxylated Acrylic | X grams | Y grams |
|---|---|---|---|---|
| Comp. Sample 7 | B | B | 2091.2 | 232.2 |
| Comp. Sample 8 | B | B | 1859.0 | 464.4 |

Comparative Samples 7 and 8 are screened for heat resistance and green strength using the qualitative hot bond grab test and the postforming test. The results for the qualitative hot bond grab test are reported in Table 9. Data for the CONTROL are given for comparison.

TABLE 9

Qualitative Hot Bond Grab Test Comparison

| Example | Polychloroprene | Carboxylated Acrylic | Rating 30 Min | Rating 60 Min |
|---|---|---|---|---|
| CONTROL | CONTROL | None | 2 | 4 |
| Comp. Sample 7 | B | B | 1 | 1 |
| Comp. Sample 8 | B | B | 1 | 1 |

Clearly, carboxylated acrylic B does not improve the formulations in Comparative Samples 7 and 8 to the point where they equal the qualitative hot bond grab test results for the CONTROL.

Results for the postforming test are reported in Table 10. Data for the CONTROL is given for comparison.

TABLE 10

Postforming Test Comparison

| Example | Polychloroprene | Carboxylated Acrylic | Rating | Comments |
|---|---|---|---|---|
| CONTROL | CONTROL | None | Pass | Stuck with some effort |
| Comp. Sample 7 | B | B | Fail | Would not stick |
| Comp. Sample 8 | B | B | Fail | Would not stick |

There is not sufficient improvement in heat resistance to continue testing.

Examples 1-4

Polychloroprene A with Carboxylated Acrylic B

Into a 1-gallon container are added with stirring successively X grams of non-carboxylated polychloroprene latex A, 54.7 grams of stabilizer latex, 91.5 grams of crosslinker dispersion, 319.8 grams of a hydrocarbon resin dispersion, 498.1 grams of a disproportionated rosin latex and Y grams of carboxylated acrylic latex B. Stirring is maintained at a rate sufficient to thoroughly mix the components of the formulation but not so high as to destabilize the emulsion.

Table 11 provides a key to the composition of Examples 1-4.

TABLE 11

Composition of Examples 1-4

| Example | Polychloroprene | Carboxylated Acrylic | X grams | Y grams |
|---|---|---|---|---|
| Ex. 1 | A | B | 2091.2 | 232.2 |
| Ex. 2 | A | B | 1859.0 | 464.4 |
| Ex. 3 | A | B | 1626.8 | 696.6 |
| Ex. 4 | A | B | 1394.6 | 928.8 |

Table 12 summarizes known differences between carboxylated acrylics A and B.

TABLE 12

Comparison of Carboxylated Acrylics A and B

| Carboxylated Acrylic | Other Comonomers | % Acid | pH |
|---|---|---|---|
| A | Acrylonitrile | Up to 3 | 9.0 |
| B | None | Greater than 3 | 9.8 |

The formulations in Examples 1-4 are tested for green strength and heat resistance using the qualitative hot bond grab, quick grab/octagon, dead load heat shear and postforming tests with the control formulation for comparison.

Table 13 reports the results for the qualitative hot bond grab test.

TABLE 13

Qualitative Hot Bond Grab Test Comparison

| Example | Polychloroprene | Carboxylated Acrylic | Rating 30 Min | Rating 60 Min |
|---|---|---|---|---|
| CONTROL | CONTROL | None | 2 | 4 |
| 1 | A | B | 3 | 4 |
| 2 | A | B | 3 | 4 |
| 3 | A | B | 2 | 2+ |

Use of polychloroprene A and carboxylated acrylic B leads to a significant improvement in green strength, comparable to or better than the CONTROL. There is some reduction in qualitative hot bond grab at the higher carboxylated acrylic level present in Example 3.

Quick grab/octagon test results are given in Table 14.

TABLE 14

Quick Grab/Octagon Test Comparison of CONTROL and Examples 1 and 2

| Example | Polychloroprene | Carboxylated Acrylic | Initial Bond Strength | Initial Pull, Legs | Initial Pull, Adhesion, Hallways | 48, 72 Hr |
|---|---|---|---|---|---|---|
| CONTROL | CONTROL | None | Great | Many, short to medium | Adhesion to both substrates, no hallways | Very strong |
| Ex. 1 | A | B | Great+ | Many, short to medium | Adhesion to both substrates, no hallways | Very strong - hard to lift edges |
| Ex. 2 | A | B | Great+ | Many, short | Adhesion to both substrates, no hallways | Very strong - hard to lift edges |

The combination of polychloroprene A and carboxylated acrylic B leads to stronger bonds with short legs and excellent initial bond strength better than or equal to the CONTROL.

The dead load heat shear test was run for Examples 1-4 with the CONTROL comparison.

Table 15 summarizes the results. The test was stopped at 399° F. Three replicates were run for each example.

TABLE 15

Dead Load Heat Shear Comparison

| Example | Polychloroprene | Carboxylated Acrylic | Failure T1 | Failure T2 | Failure T3 |
| --- | --- | --- | --- | --- | --- |
| CONTROL | CONTROL | None | >399° F. | >399° F. | >399° F. |
| Ex. 1 | A | B | >399° F. | >399° F. | >399° F. |
| Ex. 2 | A | B | >399° F. | >399° F. | >399° F. |
| Ex. 3 | A | B | >399° F. | >399° F. | >399° F. |
| Ex. 4 | A | B | 198° F. | 198° F. | 198° F. |

Examples 1-3 are comparable to the CONTROL in dead load heat shear. Higher amounts of carboxylated acrylic B lead to a decrease in heat resistance as measured by this test.

Results for the postforming test are reported in Table 16. Data for the CONTROL is given for comparison. High levels of carboxylated acrylic B eventually lead to failure in this test.

TABLE 16

Postforming Test Comparison

| Example | Polychloroprene | Carboxylated Acrylic | Rating | Comments |
| --- | --- | --- | --- | --- |
| CONTROL | CONTROL | None | Pass | Stuck with some effort |
| Ex. 1 | A | B | Pass | Stuck easily |
| Ex. 2 | A | B | Pass | Stuck easily |
| Ex. 3 | A | B | Pass | Stuck with some effort |
| Ex. 4 | A | B | Fail | Would not stick |

Block shear and cleavage results for Examples 1-3 (after 21 days curing at room temperature) are reported, respectively, in Tables 17 and 18.

TABLE 17

21 Day (RT) Block Shear Comparison

| Example | Polychloroprene | Carboxylated Acrylic | Bond Strength, psi |
| --- | --- | --- | --- |
| CONTROL | CONTROL | None | 60.9 |
| Ex. 1 | A | B | 100.2 |
| Ex. 2 | A | B | 72.6 |
| Ex. 3 | A | B | 68.6 |

While there is some decrease in bond strength with level of carboxylated acrylic B, the bond strengths for Examples 1-3 are all greater than bond strength for the CONTROL.

TABLE 18

21 Day (RT) Cleavage Comparison

| Example | Polychloroprene | Carboxylated Acrylic | Bond Strength, psi |
| --- | --- | --- | --- |
| CONTROL | CONTROL | None | 8.7 |
| Ex. 1 | A | B | 9.3 |
| Ex. 2 | A | B | 9.0 |
| Ex. 3 | A | B | 7.3 |

Cleavage values fall off at higher loadings of carboxylated acrylic B but Examples 1 and 2 show cleavage improvement over the CONTROL.

The CONTROL and Examples 1 and 2 all sprayed well with no cobwebbing, good fan width and coverage control. When subjected to more rigorous tests of robustness, Example 2 shows narrower fan width and excellent spraying characteristics over a wider variety of pressure (throughput) settings. In addition, Example 2 has much less uncontrolled dripping and overspray than the CONTROL. Random dripping can ruin a sample where one of the substrates is thin and the bump due to the drop manifests itself as an undesirable surface imperfection. The rheology of the adhesive can lead to poor latex cohesive strength resulting in large amounts of fine mist called overspray. Overspray is undesirable because it is wasteful and creates difficulties in cleanup. Customers appreciate adhesives that are robust to wider ranges of spraying conditions for reproducibility, downtime reduction and ease of operation setup.

What is claimed is:

1. A one-step water-based adhesive composition consisting essentially of:
    (A) about 30 to about 80 total weight percent of a medium or high crystallinity, medium or high gel content polychloroprene resin aqueous dispersion;
    (B) about 7 to about 45 total weight percent of a carboxylated acrylic polymer dispersion, wherein the carboxylated acrylic polymer comprises about 0.01 to about 25 weight percent carboxylate-containing groups;
    (C) about 0.01 to about 45 total weight percent of a resin aqueous dispersion, wherein the resin comprises at least one of hydrocarbon resins, disproportionated rosins, rosin esters, terpene resins, acrylic resins, hydrogenated rosin esters, polymerized rosin esters, dimerized rosins, or acid-modified rosin esters;
    (D) about 0.01 to about 10 total weight percent of a crosslinker aqueous dispersion; and
    (E) about 0.01 to about 5 total weight percent of a stabilizer in an amount to stabilize (A)-(D).

2. The composition of claim 1 in which (A) is a carboxylated polychloroprene dispersion.

3. The composition of claim 1 in which (B) comprises greater than 3 weight percent carboxylate-containing groups.

4. The composition of claim 1 in which (A) and (B) are polymer dispersions that are miscible at the molecular level.

5. The composition of claim 1 in which (A) and (B) can be mixed without destabilization due to pH differences.

6. A system for applying an adhesive to a surface, the system comprising a canister with a water resistant inner lining and a water-based adhesive composition consisting essentially of:
    (A) about 30 to about 80 total weight percent of a medium or high crystallinity, medium or high gel content polychloroprene resin aqueous dispersion;

(B) about 7 to about 45 total weight percent of a carboxylated acrylic polymer dispersion, wherein the carboxylated acrylic polymer comprises about 0.01 to about 25 weight percent carboxylate-containing groups;

(C) about 0.01 to about 45 total weight percent of a resin aqueous dispersion, wherein the resin comprises at least one of hydrocarbon resins, disproportionated rosins, rosin esters, terpene resins, acrylic resins, hydrogenated rosin esters, polymerized rosin esters, dimerized rosins, or acid-modified rosin esters;

(D) about 0.01 to about 10 total weight percent of a crosslinker aqueous dispersion; and (E) about 0.01 to about 5 total weight percent of a stabilizer in an amount to stabilize (A)-(D).

7. The system of claim 6 wherein the canister comprises a metal shell and the water-based adhesive composition is contained in a plastic bag inside the metal shell.

8. The system of claim 6 wherein the canister comprises a composite shell.

9. The system of claim 6 further comprising a propellant contained within the canister.

10. The system of claim 6 further comprising a spray gun in fluid communication with the adhesive composition.

11. A process for making a laminated article, the process comprising applying an adhesive to a surface of a first substrate layer and placing a second substrate layer over the first substrate layer such that a surface of the second substrate layer is in contact with the adhesive applied to the first substrate layer, wherein the adhesive is a one-step water-based adhesive composition consisting essentially of:

(A) about 30 to about 80 total weight percent of a medium or high crystallinity, medium or high gel content polychloroprene resin aqueous dispersion;

(B) about 7 to about 45 total weight percent of a carboxylated acrylic polymer dispersion, wherein the carboxylated acrylic polymer comprises about 0.01 to about 25 weight percent carboxylate-containing groups;

(C) about 0.01 to about 45 total weight percent of a resin aqueous dispersion, wherein the resin comprises at least one of hydrocarbon resins, disproportionated rosins, rosin esters, terpene resins, acrylic resins, hydrogenated rosin esters, polymerized rosin esters, dimerized rosins, or acid-modified rosin esters;

(D) about 0.01 to about 10 total weight percent of a crosslinker aqueous dispersion; and (E) about 0.01 to about 5 total weight percent of a stabilizer in an amount to stabilize (A)-(D).

12. The process of claim 11 further comprising applying the adhesive composition to the surface of the second substrate layer prior to placing the second substrate layer over the first substrate layer.

13. The process of claim 12 wherein the adhesive is a contact adhesive.

14. The process of claim 13 wherein the adhesive is allowed to dry to a clear film prior to placing the second substrate layer over the first substrate layer.

15. The process of claim 11 further comprising applying pressure to force the surface of the second substrate layer and the surface of the first substrate layer towards each other.

16. The process of claim 11 wherein the adhesive is applied by spraying, brushing, or rolling.

17. An article comprising a laminate that comprises an adhesive composition consisting essentially of:

(A) about 30 to about 80 total weight percent of a medium or high crystallinity, medium or high gel content polychloroprene resin aqueous dispersion;

(B) about 7 to about 45 total weight percent of a carboxylated acrylic polymer dispersion, wherein the carboxylated acrylic polymer comprises about 0.01 to about 25 weight percent carboxylate-containing groups;

(C) about 0.01 to about 45 total weight percent of a resin aqueous dispersion, wherein the resin comprises at least one of hydrocarbon resins, disproportionated rosins, rosin esters, terpene resins, acrylic resins, hydrogenated rosin esters, polymerized rosin esters, dimerized rosins, or acid-modified rosin esters;

(D) about 0.01 to about 10 total weight percent of a crosslinker aqueous dispersion; and (E) about 0.01 to about 5 total weight percent of a stabilizer in an amount to stabilize (A)-(D).

18. The article of claim 17 wherein the article is at least one of a countertop, cabinet, or furniture.

* * * * *